US010411905B2

(12) United States Patent
Smith et al.

(10) Patent No.: US 10,411,905 B2
(45) Date of Patent: Sep. 10, 2019

(54) PUBLIC KEY INFRASTRUCTURE USING BLOCKCHAINS

(71) Applicant: Intel Corporation, Santa Clara, CA (US)

(72) Inventors: Ned M. Smith, Beaverton, OR (US); David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 15/201,219

(22) Filed: Jul. 1, 2016

(65) Prior Publication Data

US 2018/0006826 A1 Jan. 4, 2018

(51) Int. Cl.
| | |
|---|---|
| *H04L 29/06* | (2006.01) |
| *H04L 9/32* | (2006.01) |
| *H04L 9/00* | (2006.01) |
| *H04L 9/06* | (2006.01) |

(Continued)

(52) U.S. Cl.
CPC ............ *H04L 9/3268* (2013.01); *H04L 9/006* (2013.01); *H04L 9/0637* (2013.01); *H04L 9/14* (2013.01); *H04L 9/30* (2013.01); *H04L 9/3247* (2013.01); *H04L 9/3263* (2013.01); *H04L 9/3265* (2013.01); *H04L 63/06* (2013.01); *H04L 63/062* (2013.01); *H04L 63/0823* (2013.01); *H04L 2209/38* (2013.01); *H04L 2209/56* (2013.01)

(58) Field of Classification Search
CPC ... H04L 9/3263; H04L 9/3265; H04L 9/3268; H04L 9/006; H04L 9/0637; H04L 63/0823
See application file for complete search history.

(56) References Cited

U.S. PATENT DOCUMENTS

| | | | |
|---|---|---|---|
| 2005/0114653 A1† | 5/2005 | Sudia | |
| 2012/0023334 A1* | 1/2012 | Brickell | ............... H04L 9/0844 |
| | | | 713/169 |
| 2015/0120567 A1 | 4/2015 | Van Rooyen et al. | |

(Continued)

FOREIGN PATENT DOCUMENTS

| | | |
|---|---|---|
| DE | 112017002263 T5 | 1/2019 |
| WO | 2018004783 | 1/2018 |

OTHER PUBLICATIONS

Moser, Malte; Bohme, Rainer; Breuker, Dominic; "An Inquiry into Money Laundering Tools in the Bitcoin Ecosystem", APWG eCrime Researchers Summit, IEEE, Sep. 17-18, 2013, 14 pages.*

(Continued)

*Primary Examiner* — Victor Lesniewski
(74) *Attorney, Agent, or Firm* — Schwegman Lundberg & Woessner, P.A.

(57) ABSTRACT

Techniques for implementing public key infrastructure using blockchains are described. An apparatus may receive, from a introducee principal, a proof-of-work. The apparatus may combine the proof-of-work with an identifier of the introducee principal. The apparatus may generate an introduction of the introducee principal. The introduction may include signing, using an asymmetric private key assigned to the apparatus, the combination of the proof-of-work and the identifier of the introducee principal. The apparatus may publish the introduction of the introducee principal to a blockchain.

17 Claims, 7 Drawing Sheets

(51) Int. Cl.
*H04L 9/14* (2006.01)
*H04L 9/30* (2006.01)

(56) References Cited

U.S. PATENT DOCUMENTS

| | | | | |
|---|---|---|---|---|
| 2016/0142215 | A1* | 5/2016 | Kruegel | H04L 9/006 |
| | | | | 713/158 |
| 2016/0191241 | A1 | 6/2016 | Allen | |
| 2016/0254910 | A1† | 9/2016 | Finlow-Bates | |
| 2016/0261685 | A1† | 9/2016 | Chen et al. | |
| 2016/0328713 | A1* | 11/2016 | Ebrahimi | H04L 9/3066 |
| 2016/0330035 | A1* | 11/2016 | Ebrahimi | H04L 9/3236 |
| 2016/0358186 | A1* | 12/2016 | Radocchia | H04W 4/70 |
| 2017/0046526 | A1* | 2/2017 | Chan | G06Q 20/0655 |
| 2017/0180134 | A1* | 6/2017 | King | H04L 9/3247 |
| 2017/0221288 | A1* | 8/2017 | Johnson | G06Q 20/045 |
| 2017/0243193 | A1* | 8/2017 | Manian | G06Q 20/3829 |
| 2017/0289138 | A1* | 10/2017 | Ben-Shalom | H04L 63/0823 |
| 2017/0316390 | A1* | 11/2017 | Smith | G06Q 20/065 |
| 2017/0317997 | A1* | 11/2017 | Smith | H04L 63/061 |
| 2017/0323392 | A1* | 11/2017 | Kasper | G06Q 40/12 |
| 2017/0345019 | A1* | 11/2017 | Radocchia | G06Q 30/018 |
| 2017/0346639 | A1* | 11/2017 | Muftic | H04L 9/3263 |
| 2017/0366357 | A1* | 12/2017 | Pattanaik | H04L 9/0825 |
| 2018/0032383 | A1* | 2/2018 | Surcouf | G06F 21/602 |
| 2018/0046823 | A1* | 2/2018 | Durham | G06F 21/6245 |
| 2018/0308098 | A1* | 10/2018 | Ebrahimi | H04L 9/3066 |

OTHER PUBLICATIONS

"International Application Serial No. PCT/US2017/027564, Invitation to Pay Additional Fees and Partial Search Report dated Jun. 28, 2017", 7 pgs.

"International Application Serial No. PCT/US2017/027564, International Search Report dated Sep. 15, 2017", 4 pgs.

"International Application Serial No. PCT/US2017/027564, Written Opinion dated Sep. 15, 2017", 8 pgs.

Conner, Fromknecht, "A Decentralized Public Key Infrastructure with Identity Retention", [Online] Retrieved from the Internet :https://eprint.iacr.org/2014/803.Pdf, (Nov. 11, 2014).

Louise, Axon, "Privacy-awareness in blockchain-based PKI", [Online] Retrieved from the Internet :https://ora.ox.ac.uk/objects/uuid:f8377b69-599b-4cae-8df0-f0cded53e63b/datastream/ATTACHMENT01, (2015).

Thomas, Hardjono, "Anonymous Identities for Permissioned Blockchains", [Online] Retrieved from the Internet :http//www.the-blockchain.corn/docs/MIT-ChainAnchor-DRAFT.pdf, (Jan. 20, 2016), 1-9 , 18 , 19.

"International Application Serial No. PCT/US2017/027564, International Preliminary Report on Patentability dated Jan. 10, 2019", 10 pgs.

* cited by examiner
† cited by third party

PUBLIC KEY INFRASTRUCTURE USING BLOCKCHAINS

TECHNICAL FIELD

The present disclosure relates generally to public key infrastructures, and specifically to implementing a public key infrastructure using blockchains.

BACKGROUND

Public key infrastructure (PKI) refers to set of roles, policies, and procedures to create, manage, distribute, use, store, and revoke digital certificates for public-key encryption. As designed, PKI includes (1) a global certificate authority ("CA") that issues and signs digital certificates, (2) a global directory authority ("DA") that stores digital certificates and lists of revoked digital certificates, indexes the digital certificates, and delivers digital certificates to requestors, and (3) a global registration authority ("RA") that verifies the identity of an entity (e.g., a person or organization) who requests their digital certificate to be stored at the DA.

PKI scalability is based on the assumption of a single global 'root' CA, whose public key is well-known and uncompromised. By storing the root CA's public key at each endpoint, each endpoint would be able to authenticate every entity participating in the PKI. Interoperability would be possible by following a certificate path to the common root key.

However, this vision of PKI never materialized. Currently, thousands of 'root' CAs exist, including self-signed certificates that essentially masquerade as a 'root' certificate. Today's PKI is synonymous with CAs only; the DA function is usually replaced by Internet search engines or disparate enterprise directory services that focus on intra-enterprise trust.

The current method for finding a root certificate is at best hit-and-miss using search query strings. Furthermore, the computer relies on a human to verify the certificate path from a certificate to a CA root. The current method for determining the revocation status of a digital certificate requires tracing through a series of reports and advisories produced by Computer Emergency Response Teams (CERT).

The current approach to PKI for the Internet is unwieldy and not positioned to scale for the Internet of Things (IoT). Predictions suggest as many as 200 billion asymmetric key pairs may be in deployment by the year 2020. Current PKI implementations appear to have significant scalability challenges both in establishing trust in digital certificates and in verification of revoked digital certificates.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments or examples discussed in the present document.

DETAILED DESCRIPTION

The present disclosure describes methods, systems, and computer program products that individually facilitate implementing a PKI using a blockchain. In the following detailed description, for purposes of explanation, numerous specific details are set forth in order to provide a thorough understanding of the various aspects of the presently disclosed subject matter. However, it will be evident to those skilled in the art, after reading and understanding the present subject matter, that the presently disclosed subject matter may be practiced without these specific details. In other instances, well-known methods, procedures, and components have not been described in detail so as not to obscure the presently disclosed subject matter.

A blockchain (or "distributed digital ledger") is a distributed database that maintains a growing list of data records that are hardened against tampering and revision. A blockchain includes "blocks," which hold data or both data and programs. Each block holds batches of individual "transactions" between blockchain participants. Each block includes a timestamp and linking information (usually a hash value) linking the current block to the previous block; the linking information allows traversal of the blockchain (in either direction).

Blockchain transactions are integrity protected using a distributed hashing algorithm that requires each transaction processor (e.g., "miner") to agree to the next block in the blockchain. Integrity is achieved through a consensus of multiple miners, each miner having access to its own copy of the ledger. If a majority of the miners agree on the contents of the ledger, then those agreed upon contents become the "truth" for the ledger; the miners that disagree will accept the truth of the majority (otherwise, they would not be able to function). Integrity is provable because an attacker would have to compromise a majority of miners and modify their copies of the ledger; this is extremely difficult (if not impossible).

Disclosed embodiments use a blockchain as a scalable infrastructure to implement distributed PKI; such embodiments are referred to in this document as "public key ledgers" (PKLs). A blockchain may be used as a repository for any public information that requires integrity; using a blockchain as a repository for CA certificates/public-keys may address the PKI problems described above. Transactions posted (or "published") to a blockchain are public and immutable. Furthermore, the sequence of transactions posted to the blockchain is also immutable; thus, the transaction path between any two transactions on the blockchain is verifiable.

PKI introduced a trust hierarchy for scalability; using PKI, three to five CAs are sufficient to reach and verify certificates globally. PKI certificate path validation thus typically involves verifying three to five signatures; this is preferable to storing locally the millions (or billions) of digital certificates that participate in the PKI. In contrast, a blockchain does not have a problem with storing lots of data, so the blockchain could store all public keys. Thus, a blockchain enables chains of trust (e.g., a first key signing a second key, the second key signing a third key, etc.) which is similar to digital certificate path validation in PKI. However, there is no requirement to create chains of trust because any blockchain participant may verify any public key by searching the blockchain.

A blockchain provides a distributed infrastructure that is resilient to manipulation and maintains high integrity. The greater the participation in the blockchain, the more difficult it is for a principal to alter the true state of the blockchain.

Figure 1:
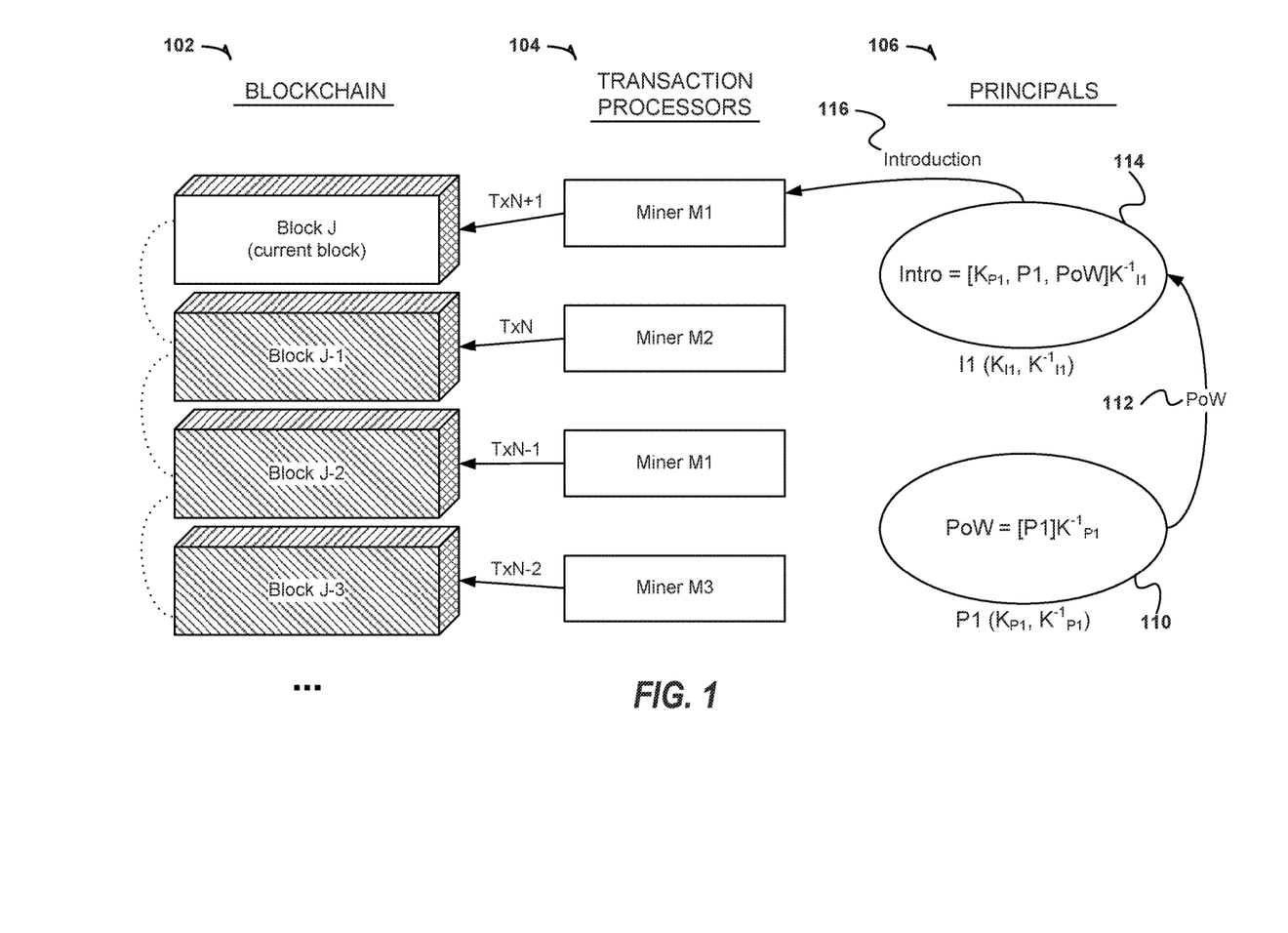
FIG. 1 illustrates an introduction transaction in which an existing principal introduces a new principal to the blockchain, according to an example embodiment.

FIG. 1 illustrates an introduction transaction 116 in which an existing principal 106 introduces a new principal 106 to the blockchain 102, according to an example embodiment. A principal 106 is an entity that possesses a public-private key pair. Examples of principals 106 include IoT devices, personal computers, server computers, smartcards, SIM cards, etc.

As used in FIG. 1, "K" is an asymmetric public key, whereas "$K^{-1}$" is an asymmetric private key. As used in FIG. 1, square brackets "[x]" denote a digital signing operation of x, whereas curly braces "{x}" denote encrypting of x. The key appended to an operation is the key used for the operation; thus, "$[x]K^{-1}$" denotes signing using asymmetric private key $K^{-1}$, and "{x}K" denotes encrypting using asymmetric public key K. As used in FIG. 1, a key subscript denotes the principal to whom the key belongs; thus, asymmetric key pair "$(K_P, K_P^{-1})$" belongs to principal P.

The term "signing" or "digital signing" is shorthand for a principal 106 using its asymmetric private key to encrypt. In an embodiment, an operation "$[x]K^{-1}$" (digital signing of content "x") may include calculating a hash value for x, then signing the hash value; this may be particularly useful when content "x" is large.

In PKI, a digital certificate verifies that a particular public key belongs to a particular principal 106. PKL replaces the traditional PKI digital certificate with a blockchain transaction 116 that associates a principal 106 to a public key; this blockchain transaction 116 is counter-signed by the introducing entity.

In PKI, a new principal registers with an RA (or opens a web account with an online CA provider), then purchases a certificate by supplying a PKCS#10 message. The CA then publishes the certificate to a DA. The newly registered principal obtains the new certificate and its certification chain from the DA and supplies it to a verifier.

In PKL, a new principal is introduced by another principal (the "introducer") by the introducer counter-signing the new principal's self-signed principal name. In an embodiment, countersigning may only be applied after verifying 1) the new principal is in possession of a private key and 2) the new principal's private key has not been previously used in the blockchain. The introducer publishes the introduction with the help of a blockchain miner, who may charge a transaction fee that is credited to the new principal. Blockchain processing serializes introductions, so there cannot be a Sybil attacker (e.g., subverting a principal's identity by forging the principal's identity).

The PKL serves as a reputation system for the principals 106 participating in the PKL. If a principal 106 introduces an entity that proves to be malicious or negligent, the PKL reliably maintains a history of past behavior that may be consulted prior to ascribing trust to the principal's key.

A public key, by itself, is untrusted until it is introduced to the blockchain by a trusted public key. A trusted public key essentially becomes a CA when it introduces another public key. If a principal 106 possessing trusted key K1 wants to introduce a principal 106 possessing an untrusted public key K2, K1 signs K2 with K1's private key. Thus, an X.509 certificate may be thought of as a blockchain transaction where the contents of the transaction include a second public key (and, optionally, some other identifying information, such as a username).

"PoW" 112 denotes a proof-of-work, which proves that the principal 106 possesses the private key that corresponds to the public key. PoW 112 may also be known or referred to as "PoP" (proof-of-possession). A principal P1 110, who wants its public key ($K_{P1}$) to be introduced to the blockchain 102, may create a PoW 112 by signing its own name ("P1") with its own private key ($K^{-1}_{P1}$); this PoW 112 ($[P1]K^{-1}_{P1}$) is equivalent to a self-signed certificate. Principal P1 110 then provides the PoW 112 to a principal I1 114 that is willing to introduce P1's public key to the blockchain 102. Introducing principal I1's public key ($K_{I1}$) is trusted because it is already on the blockchain 102; thus, $K_{I1}$ is known to everyone with access to the blockchain 102. I1 114 may then generate an introduction for P1 110 by combining P1's PoW 112 ($[P1]K^{-1}_{P1}$) with P1's public key ($K_{P1}$) and P1's name ("P1"), then signing the combination (e.g., $[K_{P1}, P1, [P1]K^{-1}_{P1}]K^{-1}_{I1}$). I1 114 may then introduce P1 110 to the blockchain 102 by publishing the introduction 116 to the blockchain 102. As long as a majority of transaction processors 104 agree to the proof-of-work, the block contents are legitimized.

Optionally, the PoW 112 may include one or more attributes (e.g., metadata). An attribute may be any information that gives context to what the key represents. An attribute may be specific to the blockchain application. For example, a focus of an IoT application may be to determine a device identifier, thus an attribute may be a device identifier (or other attributes associated with a device, such as manufacturer, power source, allowed countries of use, quality metrics, safety standards, etc.) A PKL miner publishes the introduction and PoW; any blockchain subscriber may verify the PoW and introducer signatures.

In an embodiment, the introduction for P1 may include validity information, such as an expiration date or a period of time the introduction is valid. By including validity information when a public key is published, PKL subscribers may infer there is an intended lifetime after which a second introduction is needed to refresh validity. An expired validity does not necessarily imply key compromise, but rather asserts the key holder does not intend to perform signing operations outside the validity period. Hence, transactions involving the key after the validity period may indicate improper or unauthorized use.

A principal who is to be introduced ("introducee principal" or "introducee") may wish to remain anonymous; in an embodiment, such introducee may create the PoW by using its private key to sign something other than the introducee's name or identifying attribute.

After P1 has been introduced, all transactions signed using the P1's private key may be inspected by blockchain subscribers. The transactions signed by a principal's private key may be used to construct a "reputation dossier" for the principal. A principal may protect its privacy by encrypting transaction contents, but at least some transaction metadata may contribute to the principal's reputation dossier. Because a principal may also subscribe to the PKL, the principal may monitor its own reputation for privacy revealing inferences and may chose not to engage in subsequent transactions if the principal deems the privacy risk has become unacceptable.

After P1 has been introduced, P1 may introduce other principals, who may introduce other principals, etc. Thus, the chains of trust in the PKL form a tree, with one "root" principal; this root principal is trusted by all PKL participants. Any blockchain implementation will have a first (or "root") key. In the case of BitCoin, the root key is that of Satoshi Nakamoto, who founded BitCoin; thus, Mr. Nakamoto may be considered the "global CA" for BitCoin.

PKL may also support group asymmetric keys, such as Direct Anonymous Attestation ("DAA"), Enhanced Privacy Identification ("EPID"), etc. DAA is a cryptographic primitive that enables authentication of a principal while preserving the principal's privacy. Unlike traditional digital signature algorithms, in which each entity has a unique asymmetric public key and a unique asymmetric private key, DAA provides a common group asymmetric public key that is associated with one or more unique asymmetric private keys. Using DAA, a device may prove to an external party what kind of device it is (and optionally what software is running on the device) without needing to provide the device's identity; thus, DAA enables a principal to prove that it is an authentic member of a group without revealing which member.

The principal that signs the group ID and EPID key may introduce the group to the blockchain. The EPID group ID and public EPID key may be published using a countersigned transaction, establishing that the chosen group ID is reserved to this principal. A race condition between a second principal to reserve the same group ID will be resolved by blockchain transaction serialization.

In an embodiment, a group key may also be a 'root' key in the PKL. For example, a device manufacturer may embed an EPID key in many devices. A member of the group may use the EPID key to introduce another key into the PKL. Because the group includes many private EPID keys, the identity of the device that introduced the key is not known. However, any PKL participant may verify that the introducer was a group member.

Figure 2:
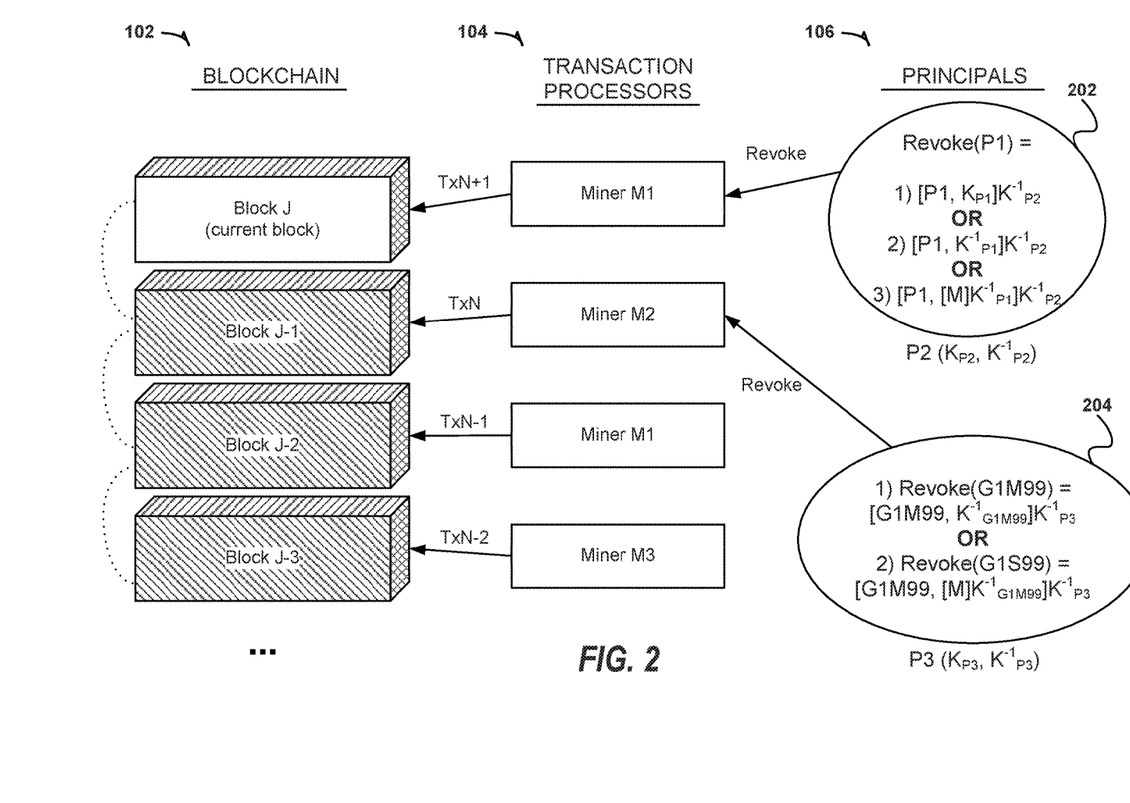
FIG. 2 illustrates operations to revoke a key that has been introduced to the blockchain, according to an example embodiment.

FIG. 2 illustrates operations to revoke a key that has been introduced to the blockchain, according to an example embodiment. A revocation is a reversal of an assertion trust of an established public key. If a revocation (or list of revocations) is posted to the blockchain, then the reversal of trust becomes well-known and immutable. Any trusted principal may revoke another principal's private key.

In PKI, a key revocation requires a certificate revocation list (CRL). Upon discovery of a compromised key, a principal requests the CA to verify the compromise and create an entry in the CRL. The CA then has to update all copies of the existing CRL. Any verifier must have the current CRL to validate the validity of a public key certificate.

In PKL, the discoverer of a compromised key may publish a compromise transaction to the blockchain; there is no separate revocation list and all blockchain subscribers have access to the assertion of key compromise. The blockchain becomes the communication mechanism between a revocation and a future revocation check, thus using blockchain as a store-and-forward communications channel.

PKL miners ensure the most current key status information is readily available to verifiers. Since miners ensure the sequences of introductions and revocations, it may not be necessary for verifiers to implement secure time. PKI requires verifiers to implement secure time to verify CRL timestamps and certificate validity periods.

The challenge to a verifier is whether to trust Y's assertion that X's private key has been compromised. Thus, a potential for abuse (in the form of unwarranted revocations) exists. Dealing with unwarranted revocations is a policy decision that may be made by each verifier (much like the policy decision regarding which keys to trust as introducers). For example, P1 may have a policy of only trusting P0 and any key trusted by P0. P0 may sign a transaction that contains P3 and P5, but not P4, and which says that P0 trusts P3 and P5 to revoke keys. When P1 sees a revocation message from either P3 or P5, P1 will trust the revocation. However, P1 will NOT trust a revocation message from P4.

If a private key of principal P1 (e.g., $K^{-1}_{P1}$) is compromised, another principal Px in possession of P1's private key may prove the compromise is legitimate in one of several ways: (1) principal Px may revoke P1's public key, (2) principal Px may revoke P1's private key, or (3) principal Px may revoke a signature produced by P1's private key.

Principal Px may revoke P1's private key ($K^{-1}_{P1}$) by publishing P1's public key ($K_{P1}$) to the blockchain. In FIG. 2, option 1 of operation 202 illustrates principal P2 revoking the asymmetric public key ($K_{P1}$) of principal P1. Principal P2 may perform this revocation by combining P1's name with P1's public key, then signing this combination with P2's private key, resulting in $[P1, K_{P1}]K^{-1}_{P2}$. P2 may then publish this revocation to the blockchain using a miner (e.g., M1).

Principal Px may also revoke P1's private key ($K^{-1}_{P1}$) by publishing P1's private key ($K^{-1}_{P1}$) to the blockchain. Publishing P1's private key ($K^{-1}_{P1}$) to the blockchain both enables all blockchain subscribers to impersonate the compromised principal P1, but also enables all blockchain subscribers to detect impersonation of compromised principal P1; hence, there is no benefit to impersonating the compromised principal P1. Thus, a policy is not needed to revoke a private key because all blockchain subscribers will ignore a private key that has been published.

In FIG. 2, option 2 of operation 202 illustrates principal P2 revoking the asymmetric private key ($K^{-1}_{P1}$) of principal P1. Principal P2 may perform this revocation by combining P1's name with P1's private key, then signing this combination with P2's private key, resulting in $[P1, K^{-1}_{P1}]K^{-1}_{P2}$. P2 may then publish this revocation to the blockchain using a miner (e.g., M1).

Principal Px may also revoke P1's private key ($K^{-1}_{P1}$) by revoking a message (M) signed by P1's private key ($K^{-1}_{P1}$). Revoking the signed message ($[M]K^{-1}_{P1}$) essentially revokes the signature that was produced by the private key ($K^{-1}_{P1}$). A verifier may compare the revoked signature to the signatures of future messages received by the verifier; if the signature of a future message matches a revoked signature, the verifier will know that the signer's private key has been revoked.

A verifier (also a blockchain subscriber) may search the blockchain to find transactions introducing the principal to be verified, other transactions involving the principal, and key revocation transactions. All necessary information necessary to verify the principal's signature and establish trust in the principal is available to the blockchain.

In FIG. 2, option 3 of operation 202 illustrates principal P2 revoking a message (M) that was signed by principal P1's asymmetric private key ($K^{-1}_{P1}$). Principal P2 may perform this revocation by combining P1's name with a message signed by P1 (e.g., ([M]$K^{-1}_{P1}$), then signing this combination with P2's private key, resulting in [P1, [M]$K^{-1}_{P1}$]$K^{-1}_{P2}$. P2 may then publish this revocation to the blockchain using a miner (e.g., M1).

PKL may also allow revocation of group keys. A private key of a group member may be revoked without revoking the private keys of the other members of the group and without revoking the public key of the group. Revocation of group keys may be achieved by revocation operations similar to those of traditional asymmetric keys. Unlike DAA, EPID supports signature revocation, which may be achieved by a principal publishing the signature of the compromised group member, counter-signed by the principal asserting key compromise. EPID also enables revocation of a private key given a signature created by that private key, even if the private key itself is still unknown. When performing signature revocation checking, the principal performing the signature revocation check must have access to all revoked signatures in the relevant group; this information is readily available to the blockchain, and thus may be obtained directly by the principal or may be supplied to the principal by a verifier.

If a principal (e.g., P3) suspects or knows that a member of a group (e.g., principal G1M99, who is member 99 of group 1) has been compromised, principal P3 may prove the compromise is legitimate in one of several ways: (1) principal P3 revoke G1M99's private group key, or (2) principal P3 may revoke a signature produced by G1M99's private group key. In FIG. 2, operation 204 illustrates two options for revoking a group key.

In FIG. 2, option 1 of operation 204 illustrates principal P3 revoking the private group key ($K^{-1}_{G1M99}$) of the 99th member of group 1 (G1M99). Principal P3 may perform this revocation by combining G1M99's name with G1M99's private group key, then signing this combination with P3's private key, resulting in [G1M99, $K^{-1}_{G1M99}$]$K^{-1}_{P3}$. P3 may then publish this revocation to the blockchain using a miner (e.g., M2).

In FIG. 2, option 2 of operation 204 illustrates principal P3 revoking a message (M) that was signed by the 99th member of group 1 (G1M99). Principal P3 may perform this revocation by combining G1M99's name with a message signed by G1M99 (e.g., ([M]$K^{-1}_{P1}$), then signing this combination with P3's private key, resulting in [G1M99, [M]$K^{-1}_{G1M99}$]$K^{-1}_{P3}$. P3 may then publish this revocation to the blockchain using a miner (e.g., M2).

For privacy reasons, a principal or group member may opt to omit its name (or its group name) from a transaction. Hence, the revoking principal may not be able to obtain or produce a revokee's name (or the name of the revokee's group). Nevertheless, the revoker may still be able to revoke the revokee using only the revokee's key or signature.

Figure 3:
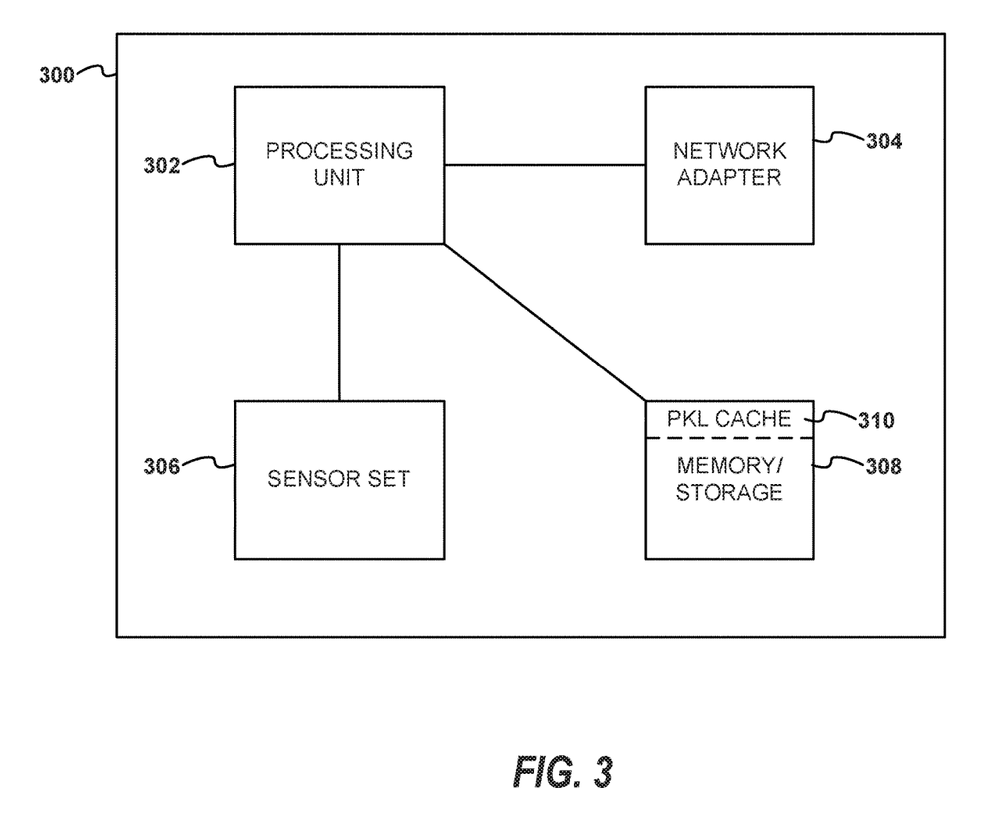
FIG. 3 illustrates a public key ledger device with embedded public key ledger processing, according to an example embodiment.

FIG. 3 illustrates a public key ledger device 300 with embedded public key ledger processing, according to an example embodiment. The PKL device 300 may be one or more of an Internet of Things device, a system on a chip device, etc. The PKL device 300 may include a processing unit 302, a network adapter 304, a sensor set 306, and memory/storage 308. The memory/storage 308 may include an accompanying PKL cache 310 for storing PKL blocks.

IoT devices may be computationally constrained; therefore, an efficient PKL device 300 may have a processing unit 302 that includes at least one of a Field Programmable Gate Array (FPGA), an application-specific integrated circuit (ASIC), or embedded software executed by a central processing unit (CPU).

A PKL device 300 may operate in "subscriber-only" mode or in "subscriber-miner" mode. Subscriber-only mode may be optimized for searching the PKL and to support introduction and verification operations. Subscriber-miner mode may add to the subscriber-only mode the ability to post transactions to the PKL and to perform proof-of-work calculations.

A PKL may operate implicitly as part of an existing blockchain or explicitly as a private (e.g., separate) blockchain that supplies principals to another blockchain (e.g., a permissioned blockchain may use a PKL system as a source of principals for the permissioned blockchain.)

If a PKL system is implemented on a private blockchain that is separate from a publicly-accessible blockchain (e.g., BitCoin), the PKL system may not have a sufficient quantity of nodes to ensure integrity of the private blockchain. In an embodiment, a solution to this problem is to calculate a hash value of every $N^{th}$ transaction that is committed to the private blockchain, then to publish that hash value to a public blockchain (e.g., BitCoin), thereby committing the known truth of the private blockchain to the public. In such an embodiment, an attacker may be able to compromise the N−1 most recent transactions in the private blockchain, but could NOT compromise the $N^{th}$ (or subsequent transactions).

Figure 4:
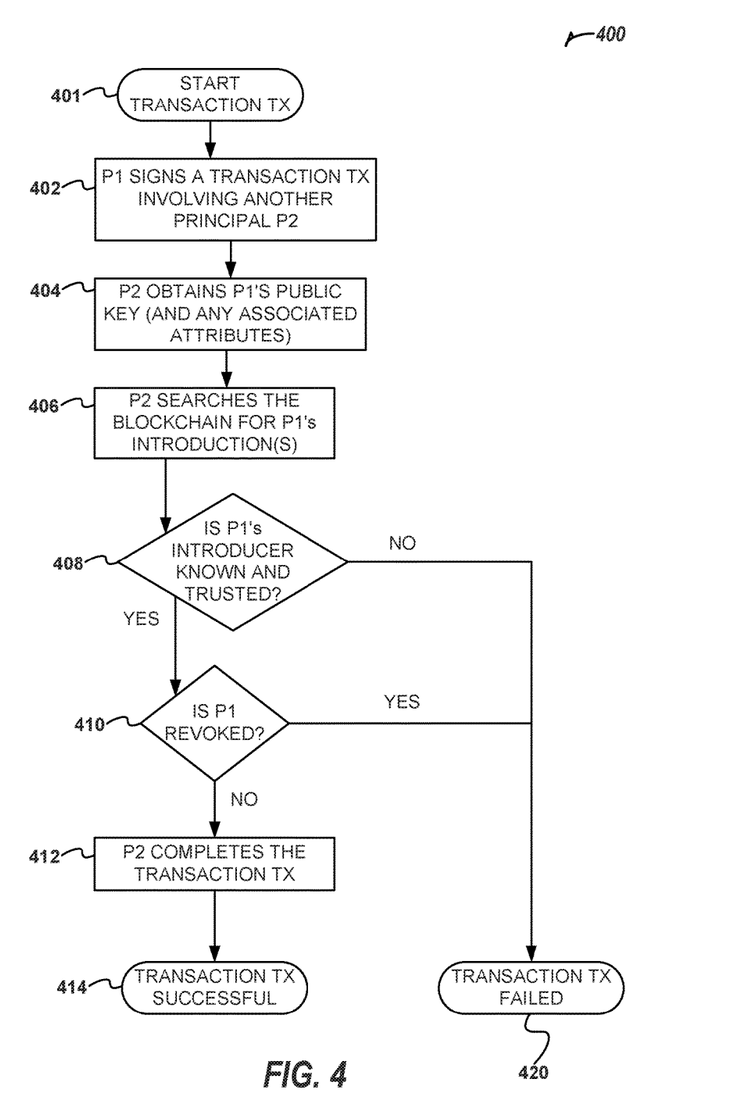
FIG. 4 is a data and control flow diagram illustrating a transaction on the public key ledger, according to an example embodiment.

FIG. 4 is a data and control flow diagram 400 illustrating a transaction on the public key ledger, according to an example embodiment. Principal P1 may start a transaction involving principal P2 (operation 401).

Principal P1 signs the transaction involving another principal P2 (operation 404). The type of the transaction is dependent upon the purpose(s) of the underlying blockchain, upon which the public key ledger is built. For example, if the underlying blockchain is the BitCoin blockchain, the transaction may be a transfer of BitCoin currency, if the underlying blockchain is a land-title registry, then a transaction may be a registration of a title to a plot of land, etc.

Principal P2 obtains principal P1's public key (operation 402). Optionally, principal P2 obtains attributes associated with principal P1's public key.

Principal P2 searches the blockchain for principal P1's introduction(s) (operation 406). Principal P1 may have multiple introductions for one or more of various reasons. For example, if a previous introduction of principal P1 included an expiration date, principal P1 may have to be reintroduced to the blockchain to be trusted. As another example, principal P1 may want multiple entities vouching for principal P1, thereby increasing principal P1's reputation within the PKL.

Principal P2 determines, for an introducer I of P1, whether the introducer I is known and trusted (operation 408). An introducer I is known and trusted by principal P2 if introducer I and principal P2 have a common introducer in their chains of trust. Because every principal has the blockchain's root principal at the root of its chain of trust, this will always be true unless an introducer along the chain of trust has been revoked; thus, principal P2 may have to determine the revocation status for each introducer I on principal P1's chain of trust. If principal P1's introducer is not known nor trusted, the transaction fails (result 420).

Figure 6:
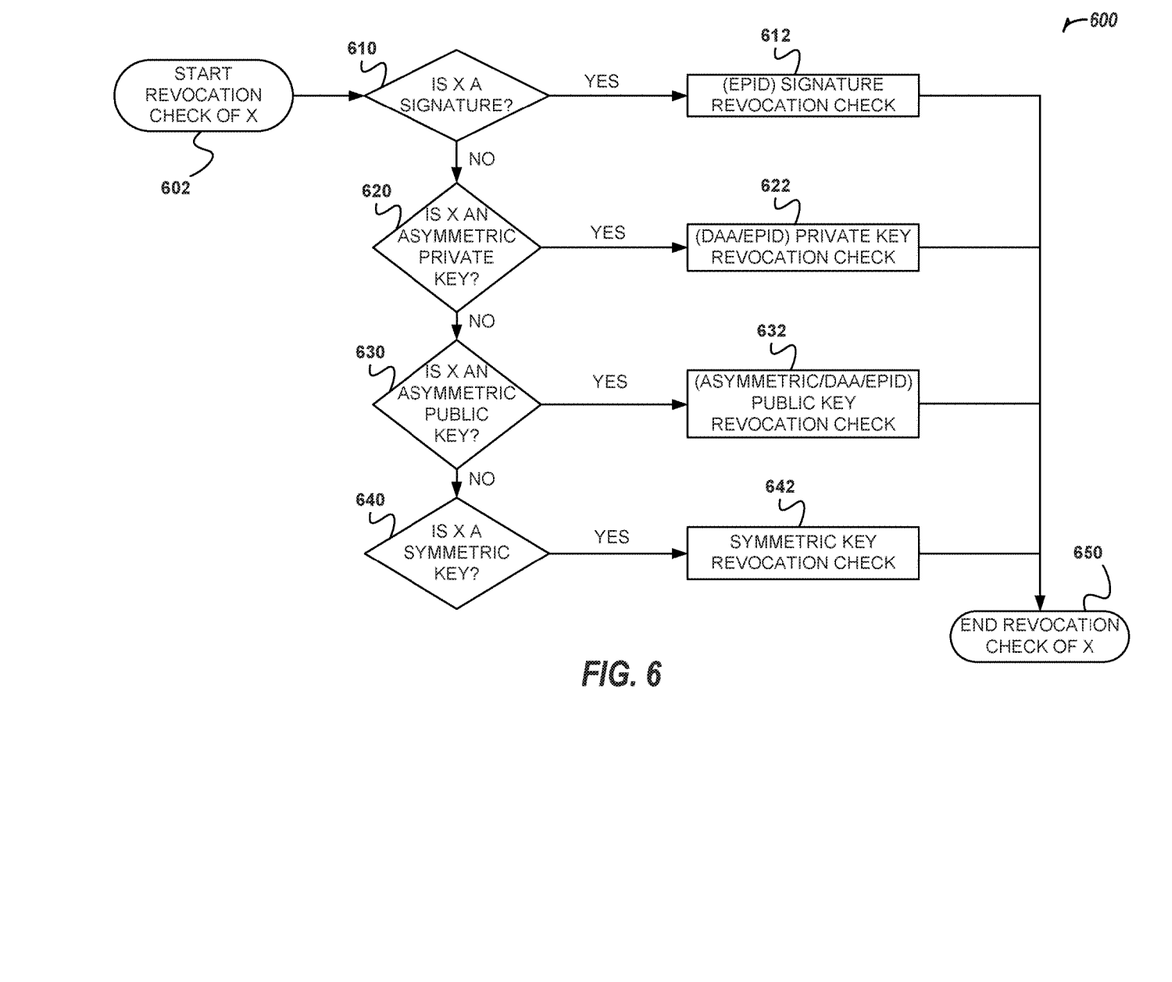
FIG. 6 is a data and control flow diagram illustrating a revocation check of a cryptographic primitive X, according to an example embodiment.

If principal P1's introducer is known and trusted, P2 determines whether principal P1 has been revoked (operation 410, which is illustrated in FIG. 6 and explained in the accompanying paragraphs). In an embodiment, the operation 410 may be repeated for each introducer in principal P1's chain of trust. If principal P1 has been revoked, the transaction fails (result 420). If principal P1 has not been revoked, P2 completes the transaction (operation 412), and the transaction is successful (result 414).

A blockchain transaction block may be defined such that empty space exists at the end of the transaction data; this empty space may be used for arbitrary data (e.g., the hash of some other transaction may be placed in the empty space). For example, a financial transaction posted to the BitCoin blockchain may have a hash value of a transaction on another distributed ledger system; this results in a larger community of nodes from which a miner needs a majority consensus.

Figure 5:
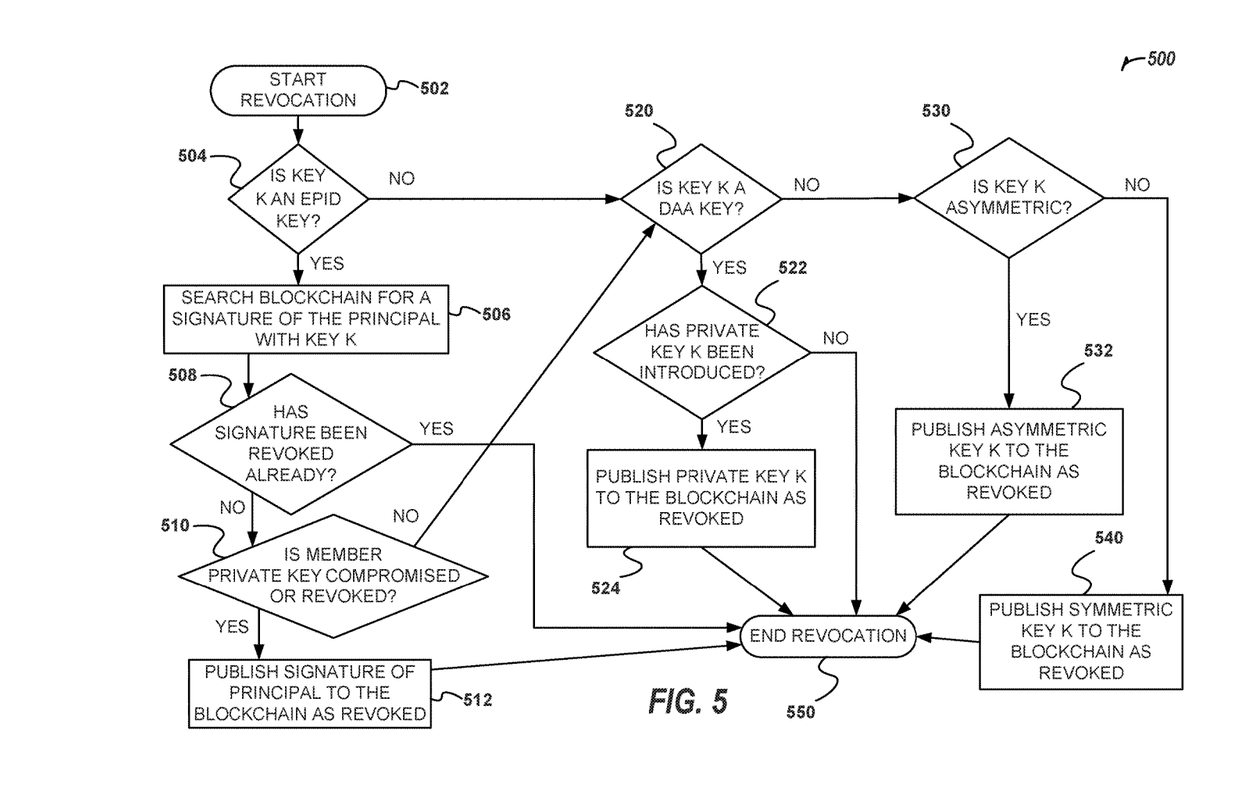
FIG. 5 is a data and control flow diagram illustrating revocation of a principal's key on the public key ledger, according to an example embodiment.

FIG. 5 is a data and control flow diagram 500 illustrating revocation of a principal's key on the public key ledger, according to an example embodiment. Any non-revoked principal Y may revoke a principal X by asserting that X's private key has been compromised; how principal Y revokes principal X depends upon the type of key that is to be revoked. The key type may be determined in a variety of ways; for example, the key type may be determined by inspecting or analyzing the meta-data within (or associated with) the key.

A revoking principal may initiate a revocation (operation 502). A determination is made whether the key (K), which is associated with the principal to be revoked, is an EPID key (operation 504). If K is an EPID key, the blockchain is searched for a signature of the principal (i.e., group member) corresponding to K (operation 506). Upon finding the signature, a revocation check of the signature is performed (operation 508) to determine whether the signature has already been revoked. If the signature has already been revoked, the revocation ends (operation 550). If the signature has not yet been revoked, a determination is made whether the member's private key is compromised or revoked (operation 510). If the member private key is compromised or revoked, the signature is published to the blockchain as revoked (operation 512), and the revocation ends (operation 550). If the member private key is not compromised or revoked, the revocation proceeds to check whether the private key is a DAA key (operation 520).

If K is not an EPID key, a determination is made whether the private key to be revoked is a DAA key (operation 520). If K is a DAA key (and, thus, a private key), a determination is made as to whether K has been introduced to the blockchain (operation 522). If K has not been introduced to the blockchain, there is nothing to revoke, and the revocation ends (operation 550). If K has been introduced to the blockchain, K is published to the blockchain as revoked (operation 524), and the revocation ends (operation 550).

If K is not a DAA key, a determination is made whether the K is asymmetric (operation 530). If K is asymmetric, K is published to the blockchain as revoked (operation 532), and the revocation ends (operation 550). If K is not asymmetric (i.e., the key is symmetric), then the symmetric key K is published to the blockchain as revoked (operation 540), and the revocation ends (operation 550).

IoT devices may be computationally constrained; thus, they may perform asymmetric cryptography slowly. Instead, of using asymmetric cryptography for all operations, an IoT framework may use asymmetric cryptography to establish a symmetric key (e.g., Diffie-Hellman Exchange), then reuse the symmetric key multiple times. The symmetric key may be revoked by simply publishing it to the blockchain.

FIG. 6 is a data and control flow diagram 600 illustrating a revocation check of a cryptographic primitive X, according to an example embodiment. A revocation check may be started (operation 602) for several reasons, for example as part of a PKL transaction (e.g., operation 410) or as part of a revocation (e.g., operation 508), etc.

A determination is made as to whether X is a signature (operation 610). If X is a signature, a signature revocation check is performed (operation 612), which may be as simple as searching the blockchain to determine if a trusted principal has posted X to the blockchain as revoked. After the signature revocation check (operation 612) completes, the revocation check ends (operation 650).

If X is not a signature, a determination is made as to whether X is an asymmetric private key (operation 620). If X is an asymmetric private key, a private key revocation check is performed (operation 622), which may be as simple as searching the blockchain to determine if X has been published to the blockchain. In an embodiment where the signature of the revoked principal was published to the blockchain, a verifier may use the allegedly revoked private key to determine whether the allegedly revoked private key produces a signature that matches the signature that was produced for the revocation transaction. If the verifier computes a signature using the allegedly revoked private key that matches the signature that was used for the revocation transaction, then the verifier may be sure that the allegedly revoked private key has actually been revoked. After the private key revocation check (operation 622) completes, the revocation check ends (operation 650).

If X is not an asymmetric private key, a determination is made as to whether X is an asymmetric public key (operation 630). If X is an asymmetric public key, a public key revocation check is performed (operation 632), which may be as simple as searching the blockchain to determine if a trusted principal has posted X to the blockchain as revoked. After the public key revocation check (operation 632) completes, and the revocation check ends (operation 650).

If X is not an asymmetric public key, a determination is made as to whether X is a symmetric key (operation 640). If X is a symmetric key, a symmetric key revocation check is performed (operation 642), which may be as simple as searching the blockchain to determine if X has been published to the blockchain. After the symmetric key revocation check (operation 642) completes, the revocation check ends (operation 650).

Figure 7:
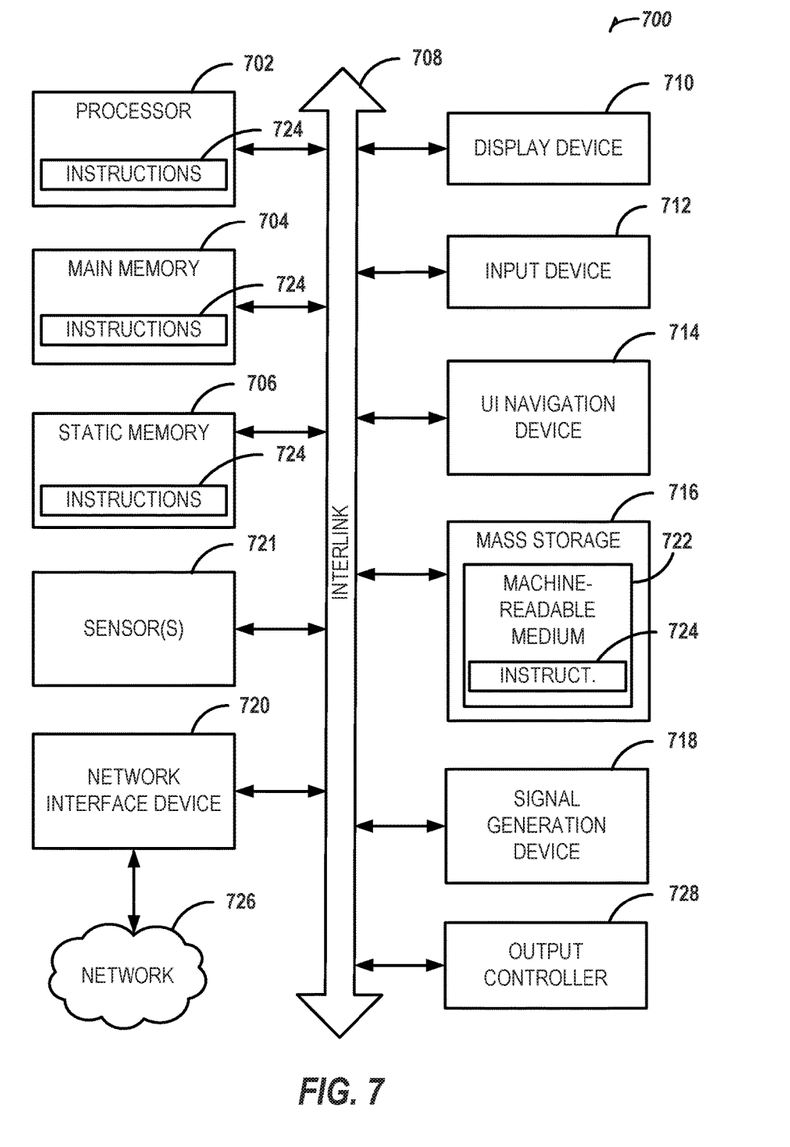
FIG. 7 is a block diagram illustrating an example of a machine, upon which any one or more example embodiments may be implemented.

FIG. 7 is a block diagram illustrating an example of a machine 700, upon which any one or more example embodiments may be implemented. In alternative embodiments, the machine 700 may operate as a standalone device or may be connected (e.g., networked) to other machines. In a networked deployment, the machine 700 may operate in the capacity of a server machine, a client machine, or both in a client-server network environment. In an example, the machine 700 may act as a peer machine in a peer-to-peer (P2P) (or other distributed) network environment. The machine 700 may implement or include any portion of the systems, devices, or methods illustrated in FIGS. 1-6, and may be a computer, a server, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., USB, parallel, or other wired or wireless (e.g., infrared (IR), near field communication (NFC), etc.) connection to communicate or control one or more peripheral devices (e.g., a printer, card reader, etc.)

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine-readable media.

Although the machine-readable medium 722 is illustrated as a single medium, the term "machine-readable medium" may include a single medium or multiple media (e.g., a centralized or distributed database, and/or associated caches and servers) configured to store the one or more instructions 724.

The term "machine-readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 724 may further be transmitted or received over a communications network 726 using a transmission medium via the network interface device 720 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, Bluetooth®, Bluetooth® low energy technology, ZigBee®, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Additional Notes & Example Embodiments

Example 1 is an apparatus for performing public key infrastructure operations using a distributed digital ledger (DDL), the apparatus comprising: a processor that, when in operation, is coupled to a network adapter and a memory; wherein the apparatus is to: receive, via the network adapter, a data package corresponding to a participant of a DDL; determine a type of the data package; and perform, based on the determined type of the data package, a revocation check of the DDL participant to determine whether the data package has been revoked.

In Example 2, the subject matter of Example 1 optionally includes wherein upon the determined type being a digital signature, the revocation check includes the apparatus to: search the DDL for a revocation transaction posted to the DDL by a revoker participant of the DDL, the revocation transaction asserting the data package as revoked; determine whether the revoker participant is trusted by the apparatus; and indicate, in response to the revoker participant being trusted by the apparatus, that the data package is revoked.

In Example 3, the subject matter of Example 2 optionally includes wherein to determine whether the revoker participant is trusted by the apparatus includes the apparatus to: search the DDL for an introducer participant that is common to a chain of trust of each of the apparatus and the revoker participant; and indicate, in response to the apparatus and the revoker participant having an introducer participant common to the chains of trust of each of the apparatus and the revoker participant, the revoker participant as trusted.

In Example 4, the subject matter of any one or more of Examples 1-3 optionally include wherein upon the determined type being an asymmetric private key, the revocation check includes the apparatus to: search the DDL for a transaction including the data package as publicly readable; and indicate, in response to the DDL including the data package as publicly readable, the data package as revoked.

In Example 5, the subject matter of any one or more of Examples 1-4 optionally include wherein upon the determined type being an asymmetric public key, the revocation check includes the apparatus to: search the DDL for a revocation transaction posted to the DDL by a revoker participant of the DDL, the revocation transaction asserting the data package as revoked; determine whether the revoker participant is trusted by the apparatus; and indicate, in response to the revoker participant being trusted by the apparatus, that the data package is revoked.

In Example 6, the subject matter of Example 5 optionally includes wherein to determine whether the revoker participant is trusted by the apparatus includes the apparatus to: search the DDL for an introducer participant that is common to a chain of trust of each of the apparatus and the revoker participant; and indicate, in response to the apparatus and the revoker participant having an introducer participant common to the chains of trust of each of the apparatus and the revoker participant, the revoker participant as trusted.

In Example 7, the subject matter of any one or more of Examples 1-6 optionally include wherein to determine a type of the data package includes the apparatus to analyze meta-data within the data package.

In Example 8, the subject matter of any one or more of Examples 1-7 optionally include wherein upon the determined type being a symmetric key, the revocation check includes the apparatus to: search the DDL for a transaction including the data package as publicly readable; and indicate, in response to the DDL including the data package as publicly readable, that the data package is revoked.

Example 9 is an apparatus for performing public key infrastructure operations using a distributed digital ledger (DDL), the apparatus comprising: a processor that, when in operation, is coupled to a network adapter and a memory; wherein the apparatus is to: receive, from a introducee principal, a proof-of-work; combine the proof-of-work with an identifier of the introducee principal; generate an introduction of the introducee principal, wherein to generate the introduction includes the apparatus to sign, using an asymmetric private key assigned to the apparatus, the combination of the proof-of-work and the identifier of the introducee principal; and publish the introduction of the introducee principal to a DDL.

In Example 10, the subject matter of Example 9 optionally includes wherein the apparatus is to revoke a revokee principal by the apparatus to: combine an asymmetric public key of the revokee principal with an identifier of the revokee principal; generate a revocation of a revokee principal, wherein to generate the revocation includes the apparatus to sign, using the asymmetric key assigned to the apparatus, the combination of the asymmetric public key of the revokee principal and the identifier of the revokee principal; and publish the revocation of the revokee principal to the DDL.

In Example 11, the subject matter of any one or more of Examples 9-10 optionally include wherein the apparatus is to revoke a revokee principal by the apparatus to: combine an asymmetric private key of the revokee principal with an identifier of the revokee principal; generate a revocation of a revokee principal, wherein to generate the revocation includes the apparatus to sign, using the asymmetric key assigned to the apparatus, the combination of the asymmetric private key of the revokee principal and the identifier of the revokee principal; and publish the revocation of the revokee principal to the DDL.

In Example 12, the subject matter of Example 11 optionally includes wherein the asymmetric private key of the revokee principal is an asymmetric group key.

In Example 13, the subject matter of any one or more of Examples 9-12 optionally include wherein the apparatus is to revoke a revokee principal by the apparatus to: combine a digital signature of the revokee principal with an identifier of the revokee principal; generate a revocation of a revokee principal, wherein to generate the revocation includes the apparatus to sign, using the asymmetric key assigned to the apparatus, the combination of the digital signature of the revokee principal and the identifier of the revokee principal; and publish the revocation of the revokee principal to the DDL.

In Example 14, the subject matter of Example 13 optionally includes wherein the digital signature of the revokee principal was generated by an asymmetric group key.

Example 15 is a method for performing public key infrastructure operations using a distributed digital ledger (DDL), the method performed by a device, the method comprising: receiving, via a network adapter of a device, a data package corresponding to a participant of a DDL; determining a type of the data package; and performing, based on the determined type of the data package, a revocation check of the DDL participant to determine whether the data package has been revoked.

In Example 16, the subject matter of Example 15 optionally includes wherein upon the determined type being a digital signature, the revocation check includes: searching the DDL for a revocation transaction posted to the DDL by a revoker participant of the DDL, the revocation transaction asserting the data package as revoked; determining whether the revoker participant is trusted by the device; and indicating, in response to the revoker participant being trusted by the device, that the data package is revoked.

In Example 17, the subject matter of Example 16 optionally includes wherein determining whether the revoker participant is trusted includes: searching the DDL for an introducer participant that is common to a chain of trust of each of the device and the revoker participant; and indicating, in response to the device and the revoker participant having an introducer participant common to the chains of trust of each of the device and the revoker participant, the revoker participant as trusted.

In Example 18, the subject matter of any one or more of Examples 15-17 optionally include wherein upon the determined type being an asymmetric private key, the revocation check includes: searching the DDL for a transaction including the data package as publicly readable; and indicating, in response to the DDL including the data package as publicly readable, the data package as revoked.

In Example 19, the subject matter of any one or more of Examples 15-18 optionally include wherein upon the determined type being an asymmetric public key, the revocation check includes: searching the DDL for a revocation transaction posted to the DDL by a revoker participant of the DDL, the revocation transaction asserting the data package as revoked; determining whether the revoker participant is trusted by the device; and indicating, in response to the revoker participant being trusted by the device, that the data package is revoked.

In Example 20, the subject matter of Example 19 optionally includes wherein determining whether the revoker participant is trusted by the device includes: searching the DDL for an introducer participant that is common to a chain of trust of each of the device and the revoker participant; and indicating, in response to the device and the revoker participant having an introducer participant common to the chains of trust of each of the device and the revoker participant, the revoker participant as trusted.

In Example 21, the subject matter of any one or more of Examples 15-20 optionally include wherein determining a type of the data package includes analyzing meta-data within the data package.

In Example 22, the subject matter of any one or more of Examples 15-21 optionally include wherein upon the determined type being a symmetric key, the revocation check includes: searching the DDL for a transaction including the data package as publicly readable; and indicating, in response to the DDL including the data package as publicly readable, that the data package is revoked.

Example 23 is a method for performing public key infrastructure operations using a distributed digital ledger (DDL), the method performed by a device, the method comprising: receiving, from a introducee principal, a proof-of-work; combining the proof-of-work with an identifier of the introducee principal; generating an introduction of the introducee principal, wherein to generate the introduction includes the device to sign, using an asymmetric private key assigned to the device, the combination of the proof-of-work and the identifier of the introducee principal; and publishing the introduction of the introducee principal to a DDL.

In Example 24, the subject matter of Example 23 optionally includes revoking a revokee principal by: combining an asymmetric public key of the revokee principal with an identifier of the revokee principal; generating a revocation of a revokee principal, wherein to generate the revocation includes the device to sign, using the asymmetric key assigned to the device, the combination of the asymmetric public key of the revokee principal and the identifier of the revokee principal; and publishing the revocation of the revokee principal to the DDL.

In Example 25, the subject matter of any one or more of Examples 23-24 optionally include revoking a revokee principal by: combining an asymmetric private key of the revokee principal with an identifier of the revokee principal; generating a revocation of a revokee principal, wherein to generate the revocation includes the device to sign, using the asymmetric key assigned to the device, the combination of the asymmetric private key of the revokee principal and the identifier of the revokee principal; and publishing the revocation of the revokee principal to the DDL.

In Example 26, the subject matter of Example 25 optionally includes wherein the asymmetric private key of the revokee principal is an asymmetric group key.

In Example 27, the subject matter of any one or more of Examples 23-26 optionally include revoking a revokee principal by: combining a digital signature of the revokee principal with an identifier of the revokee principal; generating a revocation of a revokee principal, wherein to generate the revocation includes the device to sign, using the asymmetric key assigned to the device, the combination of the digital signature of the revokee principal and the identifier of the revokee principal; and publishing the revocation of the revokee principal to the DDL.

In Example 28, the subject matter of Example 27 optionally includes wherein the digital signature of the revokee principal was generated by an asymmetric group key.

Example 29 is at least one machine-readable medium including instructions that, when executed by a machine, cause the machine to perform operations of any of the methods of Examples 15-28.

Example 30 is an apparatus comprising means for performing any of the methods of Examples 15-28.

Example 31 is an apparatus for optimizing settings of a wearable device using machine learning, the apparatus comprising: means for receiving a data package corresponding to a participant of a DDL; means for determining a type of the data package; and means for performing, based on the determined type of the data package, a revocation check of the DDL participant to determine whether the data package has been revoked.

In Example 32, the subject matter of Example 31 optionally includes wherein upon the determined type being a digital signature, the revocation check includes: means for searching the DDL for a revocation transaction posted to the DDL by a revoker participant of the DDL, the revocation transaction asserting the data package as revoked; means for determining whether the revoker participant is trusted by the apparatus; and means for indicating, in response to the revoker participant being trusted by the apparatus, that the data package is revoked.

In Example 33, the subject matter of Example 32 optionally includes wherein means for determining whether the revoker participant is trusted by the apparatus includes: means for searching the DDL for an introducer participant that is common to a chain of trust of each of the apparatus and the revoker participant; and means for indicating, in response to the apparatus and the revoker participant having an introducer participant common to the chains of trust of each of the apparatus and the revoker participant, the revoker participant as trusted.

In Example 34, the subject matter of any one or more of Examples 31-33 optionally include wherein upon the determined type being an asymmetric private key, the revocation check includes: means for searching the DDL for a transaction including the data package as publicly readable; and means for indicating, in response to the DDL including the data package as publicly readable, the data package as revoked.

In Example 35, the subject matter of any one or more of Examples 31-34 optionally include wherein upon the determined type being an asymmetric public key, the revocation check includes: means for searching the DDL for a revocation transaction posted to the DDL by a revoker participant of the DDL, the revocation transaction asserting the data package as revoked; means for determining whether the revoker participant is trusted by the apparatus; and means for indicating, in response to the revoker participant being trusted by the apparatus, that the data package is revoked.

In Example 36, the subject matter of Example 35 optionally includes wherein means for determining whether the revoker participant is trusted by the apparatus includes: means for searching the DDL for an introducer participant that is common to a chain of trust of each of the apparatus and the revoker participant; and means for indicating, in response to the apparatus and the revoker participant having an introducer participant common to the chains of trust of each of the apparatus and the revoker participant, the revoker participant as trusted.

In Example 37, the subject matter of any one or more of Examples 31-36 optionally include wherein means for determining a type of the data package includes analyzing meta-data within the data package.

In Example 38, the subject matter of any one or more of Examples 31-37 optionally include wherein upon the determined type being a symmetric key, the revocation check includes: means for searching the DDL for a transaction including the data package as publicly readable; and means for indicating, in response to the DDL including the data package as publicly readable, that the data package is revoked.

Example 39 is an apparatus for performing public key infrastructure operations using a distributed digital ledger (DDL), the apparatus comprising: means for receiving, from a introducee principal, a proof-of-work; means for combining the proof-of-work with an identifier of the introducee principal; means for generating an introduction of the introducee principal, wherein to generate the introduction includes the apparatus to sign, using an asymmetric private key assigned to the apparatus, the combination of the proof-of-work and the identifier of the introducee principal; and means for publishing the introduction of the introducee principal to a DDL.

In Example 40, the subject matter of Example 39 optionally includes means for revoking a revokee principal by: means for combining an asymmetric public key of the revokee principal with an identifier of the revokee principal; means for generating a revocation of a revokee principal, wherein to generate the revocation includes the apparatus to sign, using the asymmetric key assigned to the apparatus, the combination of the asymmetric public key of the revokee principal and the identifier of the revokee principal; and means for publishing the revocation of the revokee principal to the DDL.

In Example 41, the subject matter of any one or more of Examples 39-40 optionally include means for revoking a revokee principal by: means for combining an asymmetric private key of the revokee principal with an identifier of the revokee principal; means for generating a revocation of a revokee principal, wherein to generate the revocation includes the apparatus to sign, using the asymmetric key assigned to the apparatus, the combination of the asymmetric private key of the revokee principal and the identifier of the revokee principal; and means for publishing the revocation of the revokee principal to the DDL.

In Example 42, the subject matter of Example 41 optionally includes wherein the asymmetric private key of the revokee principal is an asymmetric group key.

In Example 43, the subject matter of any one or more of Examples 39-42 optionally include means for revoking a revokee principal by: means for combining a digital signature of the revokee principal with an identifier of the revokee principal; means for generating a revocation of a revokee principal, wherein to generate the revocation includes the apparatus to sign, using the asymmetric key assigned to the apparatus, the combination of the digital signature of the revokee principal and the identifier of the revokee principal; and means for publishing the revocation of the revokee principal to the DDL.

In Example 44, the subject matter of Example 43 optionally includes wherein the digital signature of the revokee principal was generated by an asymmetric group key.

Each of these non-limiting examples may stand on its own, or may be combined in various permutations or combinations with one or more of the other examples.

Conventional terms in the fields of computer systems and cryptology have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects. In this document, a sensor set may include one or more sensors, which may be of different types. Furthermore, two different sensor sets may include one or more sensors that belong to both sensor sets.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The above description is intended to be illustrative, and not restrictive. For example, the above-described examples (or one or more aspects thereof) may be used in combination with each other. Other embodiments may be used, such as by one of ordinary skill in the art upon reviewing the above description.

What is claimed is:

1. An apparatus for performing public key infrastructure operations using a distributed digital ledger (DDL), the apparatus comprising:
a processor that, when in operation, is coupled to a network adapter and a memory;
wherein the apparatus is to:
receive, via the network adapter, a block corresponding to a participant of a DDL;
perform an ordered sequential analysis of metadata of the block to identify a credential, wherein the ordered sequential analysis identifies the credential in a sequence of a digital signature, an asymmetric private key, an asymmetric public key, and a symmetric key;
perform, based on the credential, a revocation check of the DDL participant to determine whether the credential has been revoked, wherein operation for the revocation check include operations to:
identify an expiration date for the credential;
search the DDL to identify an integrity transaction involving the credential; and
indicate, based on the integrity transaction and current date exceeding the expiration date, that the credential is revoked.

2. The apparatus of claim 1, wherein upon the credential being a digital signature, the revocation check further includes operations for the apparatus to:
search the DDL for a revocation transaction posted to the DDL by a revoker participant of the DDL, the revocation transaction asserting the credential as revoked;
determine whether the revoker participant is trusted by the apparatus; and
indicate, in response to the revoker participant being trusted by the apparatus, that the credential is revoked.

3. The apparatus of claim 2, wherein to determine whether the revoker participant is trusted by the apparatus includes the apparatus to:
search the DDL for an introducer participant that is common to a chain of trust of each of the apparatus and the revoker participant; and
indicate, in response to the apparatus and the revoker participant having an introducer participant common to the chains of trust of each of the apparatus and the revoker participant, the revoker participant as trusted.

4. The apparatus of claim 1, wherein upon the credential being an asymmetric private key, the revocation check further includes operations for the apparatus to:
search the DDL for a transaction including the credential as publicly readable; and
indicate, in response to the DDL including the credential as publicly readable, the credential as revoked.

5. The apparatus of claim 1, wherein upon the credential being an asymmetric public key, the revocation check further includes operations for the apparatus to:
search the DDL for a revocation transaction posted to the DDL by a revoker participant of the DDL, the revocation transaction asserting the credential as revoked;
determine whether the revoker participant is trusted by the apparatus; and
indicate, in response to the revoker participant being trusted by the apparatus, that the credential is revoked.

6. The apparatus of claim 5, wherein to determine whether the revoker participant is trusted by the apparatus includes the apparatus to:
search the DDL for an introducer participant that is common to a chain of trust of each of the apparatus and the revoker participant; and
indicate, in response to the apparatus and the revoker participant having an introducer participant common to the chains of trust of each of the apparatus and the revoker participant, the revoker participant as trusted.

7. The apparatus of claim 1, wherein upon the credential being a symmetric key, the revocation check further includes operations for the apparatus to:
search the DDL for a transaction including the credential as publicly readable; and
indicate, in response to the DDL including the credential as publicly readable, that the credential is revoked.

8. The apparatus of claim 1, wherein the DDL is a blockchain and a transaction of the DDL is processed by a miner.

9. A method for performing public key infrastructure operations using a distributed digital ledger (DDL), the method performed by a device, the method comprising:
receiving, via a network adapter of a device, a block corresponding to a participant of a DDL;
performing an ordered sequential analysis of metadata of the block to identify a credential, wherein the ordered sequential analysis identifies the credential in a sequence of a digital signature, an asymmetric private key, an asymmetric public key, and a symmetric key;
performing, based on the credential, a revocation check of the DDL participant to determine whether the credential has been revoked, wherein the revocation check includes:
identifying an expiration date for the credential;
searching the DDL to identify an integrity transaction involving the credential; and
indicating, based on the integrity transaction and current date exceeding the expiration date, that the credential is revoked.

10. The method of claim 9, wherein upon the credential being a digital signature, the revocation check further includes:
searching the DDL for a revocation transaction posted to the DDL by a revoker participant of the DDL, the revocation transaction asserting the credential as revoked;
determining whether the revoker participant is trusted by the device; and
indicating, in response to the revoker participant being trusted by the device, that the credential is revoked.

11. The method of claim 10, wherein determining whether the revoker participant is trusted includes:
searching the DDL for an introducer participant that is common to a chain of trust of each of the device and the revoker participant; and
indicating, in response to the device and the revoker participant having an introducer participant common to the chains of trust of each of the device and the revoker participant, the revoker participant as trusted.

12. The method of claim 9, wherein upon the credential being an asymmetric public key, the revocation check further includes:
searching the DDL for a revocation transaction posted to the DDL by a revoker participant of the DDL, the revocation transaction asserting the credential as revoked;

determining whether the revoker participant is trusted by the device; and indicating, in response to the revoker participant being trusted by the device, that the credential is revoked.

13. The method of claim 12, wherein determining whether the revoker participant is trusted by the device includes:

searching the DDL for an introducer participant that is common to a chain of trust of each of the device and the revoker participant; and indicating, in response to the device and the revoker participant having an introducer participant common to the chains of trust of each of the device and the revoker participant, the revoker participant as trusted.

14. At least one non-transitory machine-readable medium including instructions that, when executed by a machine, cause the machine to:

receive, via a network adapter, a block corresponding to a participant of a DDL;

perform an ordered sequential analysis of metadata of the block to identify a credential, wherein the ordered sequential analysis identifies the credential in a sequence of a digital signature, an asymmetric private key, an asymmetric public key, and a symmetric key;

perform, based on the credential, a revocation check of the DDL participant to determine whether the credential has been revoked, wherein the revocation check include instructions to:

identify an expiration date for the credential;

search the DDL to identify an integrity transaction involving the credential; and indicate, based on the integrity transaction and current date exceeding the expiration date, that the credential is revoked.

15. The at least one machine-readable medium of claim 14, wherein upon the credential being a digital signature, the revocation check further includes operations to:

search the DDL for a revocation transaction posted to the DDL by a revoker participant of the DDL, the revocation transaction asserting the credential as revoked;

determine whether the revoker participant is trusted by the machine; and indicate, in response to the revoker participant being trusted by the machine, that the credential is revoked.

16. The at least one machine-readable medium of claim 15, wherein to determine whether the revoker participant is trusted by the machine includes operations to:

search the DDL for an introducer participant that is common to a chain of trust of each of the machine and the revoker participant; and indicate, in response to the machine and the revoker participant having an introducer participant common to the chains of trust of each of the machine and the revoker participant, the revoker participant as trusted.

17. The at least one machine-readable medium of claim 14, wherein upon the credential being an asymmetric public key, the revocation check further includes the machine to:

search the DDL for a revocation transaction posted to the DDL by a revoker participant of the DDL, the revocation transaction asserting the credential as revoked;

determine whether the revoker participant is trusted by the machine; and indicate, in response to the revoker participant being trusted by the machine, that the credential is revoked.

\* \* \* \* \*